Nov. 4, 1952   N. H. OSBURN   2,616,197
PICTURE FRAME
Filed Aug. 2, 1948

Inventor
Neild H. Osburn
By Ralph B. Stewart
ATTORNEY.

Patented Nov. 4, 1952

2,616,197

UNITED STATES PATENT OFFICE 2,616,197

PICTURE FRAME

Neild H. Osburn, Pasadena, Calif.

Application August 2, 1948, Serial No. 42,030

3 Claims. (Cl. 40—152)

1

This invention relates to a frame for mounting pictures and the like and to a novel hinge construction for fastening together two or more of such frames.

An object of my invention is to provide a picture frame which presents a pleasing appearance and at the same time is sturdy and inexpensive to construct.

A further object of my invention is to provide a novel hinge construction for pivotally fastening together a pair of the frames of my invention.

These and the other objects of my invention, which will appear in the description below, are accomplished in general by forming the sides of my new picture frame of relatively thin strip material, either of sheet metal or of sheet plastic or of other suitable material, such strip material being formed into the shape of a curved channel, with a bead formed along one edge thereof projecting into the channel. To provide a pair of the hinged frames of my invention, corresponding channeled sides of each of two frames are provided with transverse slots. Elongated strips are inserted in the slots, one portion of each strip being fastened to the inner edge of one of the sides and another short portion of each strip projecting from the slot at right angles thereto, and being provided with means forming a pivotal connection with a like portion projecting similarly from the opposite side of another frame.

The following description is of a particular embodiment of my invention which is merely illustrative thereof and is not to be construed as limiting it, since it is obvious that modifications may be made without departing from the spirit of the invention.

In the drawings, Figure 1 is a front view of the picture frame of my invention, showing a pair of such frames hinged together.

Figure 1:
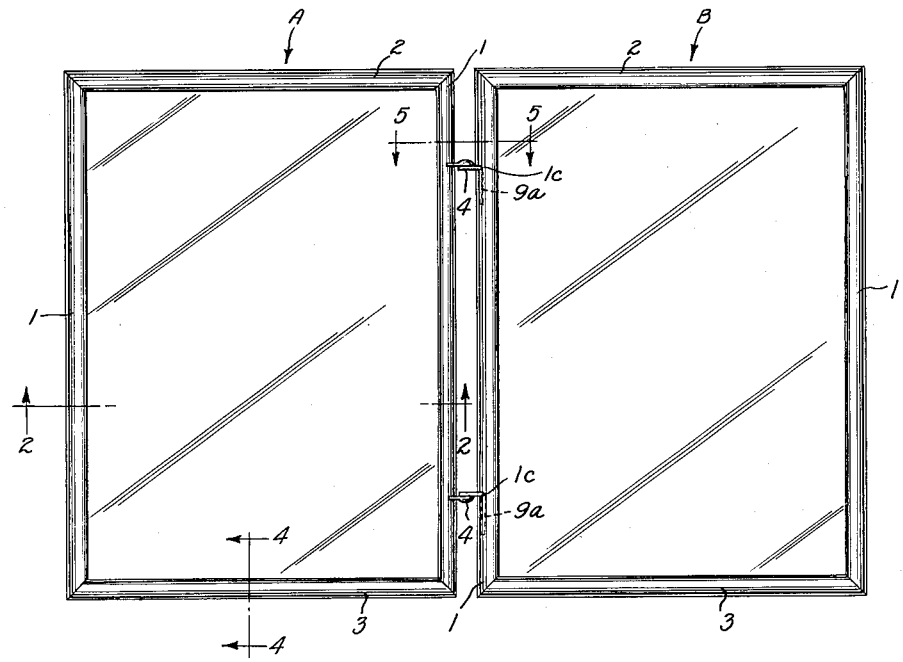

Referring now to Figure 1, the letters A and B designate respectively rectangular frames having vertical sides 1 and top sides 2, and bottom sides 3. Frames A and B are shown pivotally connected by hinges designated generally by the numerals 4, although it is obvious that each frame may be used alone.

Figure 2:
Figure 2 is a cross section of one of such frames on the line 2—2 of Figure 1.

As shown in Figure 2, the vertical sides 1 of the frame are formed of relatively thin strips, the major portion of the width of which is curved so as to form a channel $1a$ along the length of each strip, said channel having a relatively large radius of curvature, and being adapted to receive the sides of the picture 5 together with the glass pane 6 and the backing member 7. The channel $1a$ is illustrated as being substantially semi-cylindrical, but it is apparent that any other smoothly curved channel shape might be used. Along one edge of the channel $1a$, and adjacent the face of the frame, a bead $1b$ is formed by curving inwardly of the channel a relatively narrow edge portion of the strip on a relatively small radius of curvature compared with the radius of curvature of the channel $1a$. The bead $1b$ partially overhangs and projects into the channel, the edge of the bead along its entire length being in contact with the face of the glass pane 6. The backing member 7 is formed of stiff material, such as cardboard, of suitable thickness relative to the width of the channel $1a$ so as to hold the glass pane 6 securely in contact with the inner edges of the beads $1b$. The top sides 2 are constructed similarly to the sides 1.

Figure 4:
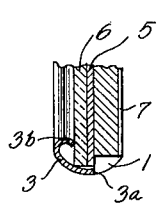
Figure 4 is a sectional view taken on the line 4—4 of Figure 1.

The bottom sides 3 are similarly formed of relatively thin strip material having the major portion of the width thereof curved on the same radius of curvature as the channel portions of the sides 1 and 2, and having a bead formed along one edge thereof adjacent the face of the frame similar to the bead $1b$ on the sides 1 and 2. As shown in Figure 4, however, the bottom side 3 is of lesser width than the remaining sides to allow the picture, glass, and backing member to be inserted into the channels $1a$ formed in the remaining sides. In other words, the bottom side 3 is formed in the same manner as vertical sides 1 and top side 2, but the back portion of the open channel $3a$ immediately below the backing piece 7 is cut away to provide an opening through which the pieces 5, 6 and 7 may be inserted into the frame.

Figure 3:
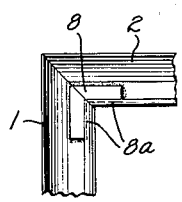
Figure 3 is a back view showing the details of the construction at one corner of the frame.

The end of each side is given a 45° mitre on opposing ends and the sides are then soldered or otherwise fastened together. As shown in Figure 3 an L-shaped reinforcing strip 8 is preferably inserted at each corner, the sides $8a$ thereof fitting snugly against the inner surface of the curved bead 1b and being soldered or otherwise bonded to the abutting ends of adjacent sides. The joint provided as described above is both strong and of good appearance. If the sides are formed of metal strips, solder applied over the reinforcing strips 8 will provide a sturdy joint of rigid monolithic structure, while at the same time all evidence of soldering or reinforcement is completely concealed within the interior of the channels 1a.

It will be noted that my frame is formed of two oppositely facing channel portions. The channel portion 1a of larger radius faces inwardly of the frame, while the bead 1b formed at one edge channel 1a constitutes a second channel of smaller radius facing into the first channel, or facing outwardly of the frame. It will be noted that the free edge of the smaller channel 1b is directed outwardly in a plane substantially parallel with the plane of the frame.

The frame described above is very simple to manufacture. The channeled, beaded sides are most conveniently formed of flat strips of sheet metal rolled into shape, or the strips may be drawn through a die and properly shaped in one operation. As explained above, to join the sides together they are merely given a 45° mitre at the ends thereof, a reinforcing strip and solder being then applied at the inside of the joint. If it should be desired to form the side members of a plastic material, such a cellulose acetate, methyl methacrylate or the like, a flat strip of the plastic could be drawn through a die similarly to the metal strip, or the plastic composition may be extrusion molded to the proper shape. Plastic side members could be heat welded, cemented or otherwise fastened together at the corners similarly to the metal sides, including the use of the angle pieces 8.

Figure 6:
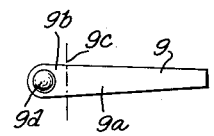
Figure 6 is a top plan view of one of the flat strips used to form the hinges of my invention.
Figure 5:
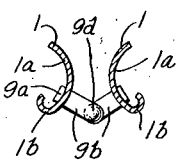
Figure 5 is a sectional view taken on line 5—5 of Figure 1, also showing a top plan view of the hinge of my invention.

Figures 5 and 6 show the details of the hinge construction which I have devised to provide convenient and simple means for hinging a pair of my frames together. Figure 6 shows one of the flat strips 9, a pair of which forms a hinge. Each strip 9 has a tapered elongated portion 9a which is bent along the line 9c at right angles to a shorter portion 9b. The long portion 9a is inserted in the transverse slots 1c, cut in corresponding sides 1 at corresponding points along the length thereof and adjacent the bead formed thereon, and are then pressed snugly against the inside of channel 1a adjacent the bead 1b, as shown in Figure 5, and soldered or otherwise fastened thereto. If desired, the portion 9a of the strip 9 may be given a curvature across the width thereof so that it conforms more perfectly to the curved contour of channel 1a. The short portion 9b will then project from the slot 1c at right angles thereto and at right angles to the sides 1. Corresponding short portions 9b on adjacent frames project into overlapping relation as shown in Figure 5, and are provided with means for pivotally connecting said short portions together. A ball and socket arrangement, designated generally by 9d is shown, wherein a hollow, generally hemispherical knob or teat is formed on both of the short portions 9b and the outer portion of the teat on one hinge part is seated in the socket of the teat on the other hinge part. With this arrangement, all the hinge parts are formed alike as shown in Figure 6, but when they are mounted on two frames, the teats on the uppermost and lowermost hinge parts must be facing in opposite directions, see Figure 1.

Other types of construction may be used to pivotally connect the short portion 9b. My hinge construction is characterized particularly by simplicity of construction, since it can be made merely by a simple stamping operation and assembled with a minimum of labor. In addition, they are small and inconspicuous, no parts thereof being visible except the short portions 9b projecting from the slots 1c.

An important feature of my invention is the bead 1b formed adjacent the face of the frame. As can be seen best in Figure 2, this bead serves to provide a positive means in cooperation with the backing member 7 for holding the glass 6 securely in place. As described above, the edge of the bead 1b is in contact with the glass 6 at all points along its length. In addition to holding the glass securely in place the bead 1b provides a means for holding the surface of the picture away from the face of the frame. Thus a greater depth from the face of the frame to the surface of the picture is secured giving the frame a more pleasing appearance. Finally, the use of the bead 1b in connection with the curved channel provides a continuously curving section at all points. The symmetry of the contour presented by this section gives the frame a very pleasing appearance. There is no break in the symmetry even at the corners, since the contour of the channel and the bead is not altered and the continuously curving section is always preserved, thus providing a very attractive corner.

Obviously any attractive and ornamental finish may be given to the sides, for instance, a highly polished bronze or chrome finish may be employed or a hammered metal finish might be used. If plastic is used to form the sides, obviously any of the various dyes and pigments may be incorporated therein to give any desired type of decorative finish.

I claim:

1. A device for mounting pictures and the like comprising a pair of rectangular frames, the sides thereof being each comprised of an elongated strip of relatively thin material, the major portion of the width of said strip being curved so as to form a channel along the length thereof, one corresponding side of each frame being provided with a plurality of transverse slots, said slots being arranged at corresponding points along the length of and adjacent the edge of each corresponding side, a plurality of hinges for pivotally connecting said frames together, each of said hinges comprising a pair of flat strips, each strip of each pair having a portion fastened to the inside edge of the channel portion of one of said corresponding sides, and each strip of each pair having a relatively short portion extending through one of said slots at right angles to said elongated portion and to both of said corresponding sides, corresponding ones of said short portions being provided with means for pivotally connecting corresponding pairs of said strips.

2. A device for mounting pictures and the like comprising a pair of rectangular frames, the sides thereof being each comprised of an elongated strip of relatively thin material, the major portion of the width of said strip being curved so as to form a channel along the length thereof, said channel being adapted to receive one side of a picture, a relatively narrow portion of the width of said strip along one edge thereof being curved inwardly of said channel on a relatively smaller radius of curvature than the radius of curvature of said channel so as to form a curved bead along one edge of and partially projecting into said channel, one corresponding side of each frame being provided with a plurality of transverse slots, said slots being arranged at corresponding points along the length of and adjacent the bead formed on each corresponding side, a plurality of hinges for pivotally connecting said frames together, each of said hinges comprising a pair of flat strips, each strip of each pair having a portion fastened to the inside edge of one of the corresponding sides adjacent the bead formed thereon, and each strip of each pair having a relatively short portion extending through one of said slots at right angles to said elongated portion and to both of said corresponding sides, corresponding ones of said short portions being provided with means for pivotally connecting corresponding pairs of said strips.

3. A frame for mounting a picture between a glass plate and a backing board comprising a rectangular frame each side of which is formed of an elongated strip of relatively thin material, the major portion of the width of said strip being curved so as to form a substantially semi-cylindrical channel of relatively large radius of curvature along the length of said strip, said channel being arranged to face inwardly of said frame to receive one edge portion of said glass plate and one edge portion of said backing board, a relatively narrow portion of the width of said strip adjacent the face of said frame and along one edge of said channel being curved inwardly of said channel on a relatively smaller radius of curvature than the radius of curvature of said channel so as to form a smaller channel of semicylindrical section along one edge of said first-mentioned channel, said smaller channel being arranged to face into said larger channel and extending over only a small fractional part of said larger channel, the free edge of said smaller channel forming a seat for said glass plate, the bottom side of said frame having a narrow portion thereof cut away along its rear edge to provide an opening of a width equal to the thickness of said backing board, whereby said glass plate and said backing board may be inserted into said frame through said opening, the sides of said frame being joined at each corner in a mitered joint, each joint including an L-shaped angle piece bridged across the joint and having the arms thereof positioned within the adjoining frame sides and being bonded to the inner channelled surfaces of said adjoining frame sides to form a rigid, monolithic joint, said angle pieces being located entirely to the front of the plane of the free edge of said smaller channel, and said smaller channel being sufficiently shallow to allow said L-shaped angle pieces to be applied across the corner joints through said larger channel after said frame sides have been placed in proper final position.

NEILD H. OSBURN.

REFERENCES CITED

The following references are of record in the file of this patent:

UNITED STATES PATENTS

| Number | Name | Date |
|---|---|---|
| 400,151 | White | Mar. 26, 1889 |
| 437,949 | Talcott | Oct. 7, 1890 |
| 1,068,621 | Abraham | July 29, 1913 |
| 1,291,375 | Berg | Jan. 14, 1919 |
| 1,770,050 | Thompson | July 8, 1930 |
| 2,081,722 | Weinzierl | May 25, 1937 |
| 2,113,871 | Bozung | Apr. 12, 1938 |
| 2,185,904 | Stowe | Jan. 2, 1940 |
| 2,259,434 | Blodgett | Oct. 21, 1941 |
| 2,317,708 | Zareko | Apr. 27, 1943 |
| 2,464,514 | Kaufmann | Mar. 15, 1949 |

FOREIGN PATENTS

| Number | Country | Date |
|---|---|---|
| 150,369 | Austria | Aug. 10, 1937 |